United States Patent
Miao et al.

(10) Patent No.: US 8,097,203 B2
(45) Date of Patent: Jan. 17, 2012

(54) CROSSLINKED GREEN BODY ARTICLES AND METHOD OF MANUFACTURING POROUS CERAMIC ARTICLES THEREFROM

(75) Inventors: Weiguo Miao, Big Flats, NY (US); Steven Bolaji Ogunwumi, Painted Post, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 799 days.

(21) Appl. No.: 11/699,288

(22) Filed: Jan. 29, 2007

(65) Prior Publication Data

US 2008/0179771 A1 Jul. 31, 2008

(51) Int. Cl.
*B29C 65/00* (2006.01)
*C04B 38/00* (2006.01)
*C04B 38/06* (2006.01)

(52) U.S. Cl. .............. 264/669; 501/80; 501/81; 501/82; 501/83

(58) Field of Classification Search .............. 264/41–44, 264/413–415, 425, 434
See application file for complete search history.

(56) References Cited

U.S. PATENT DOCUMENTS

| | | | | |
|---|---|---|---|---|
| 5,082,607 | A * | 1/1992 | Tange et al. | 264/44 |
| 6,087,024 | A * | 7/2000 | Whinnery et al. | 428/613 |
| 6,555,032 | B2 * | 4/2003 | Gadkaree | 264/29.7 |
| 7,208,108 | B2 * | 4/2007 | Otsuka et al. | 264/44 |
| 7,575,618 | B2 * | 8/2009 | Miao et al. | 55/523 |
| 2002/0011683 | A1 * | 1/2002 | Gadkaree et al. | 264/44 |
| 2003/0094716 | A1 * | 5/2003 | Gadkaree et al. | 264/29.1 |
| 2004/0051196 | A1 * | 3/2004 | Otsuka et al. | 264/41 |
| 2004/0261384 | A1 * | 12/2004 | Merkel et al. | 55/523 |
| 2005/0069469 | A1 * | 3/2005 | Fu et al. | 422/177 |
| 2005/0196586 | A1 * | 9/2005 | Shimodaira et al. | 428/116 |
| 2006/0003143 | A1 * | 1/2006 | Uchida et al. | 428/116 |
| 2007/0003750 | A1 * | 1/2007 | Kim et al. | 428/312.2 |

FOREIGN PATENT DOCUMENTS

WO 2007/126603 1/2007

* cited by examiner

*Primary Examiner* — Matthew Daniels
*Assistant Examiner* — Jodi C Franklin
(74) *Attorney, Agent, or Firm* — Matthew B. McNutt

(57) ABSTRACT

The invention describes a high porosity ceramic article and method of manufacturing the same and intermediate dried honeycomb green body articles. The article may have a total porosity of at least about fifty-five percent, above sixty percent, or even above sixty-five percent. The method of manufacture includes mixing a ceramic-forming powder, an organic pore former, water, and a crosslinker. Drying causes a condensation reaction between the pore former and the crosslinker thereby forming a network within the green body that strengthens the green body and reduces cracking. The pore former may include starch or an activated cellulose compounds. Secondary pore forming agents, such as graphite may also be included.

14 Claims, No Drawings ured articles. In particular wall-flow filter
CROSSLINKED GREEN BODY ARTICLES AND METHOD OF MANUFACTURING POROUS CERAMIC ARTICLES THEREFROM

FIELD OF THE INVENTION

The invention relates to porous ceramic articles, more particularly to ceramic articles having high porosities and a method of manufacturing such high porosity ceramic articles.

BACKGROUND OF THE INVENTION

Porous ceramic articles find utility in a variety of applications where resistance to high temperature or chemical attack is important. U.S. patent application Ser. No. 11/394,594 filed Mar. 30, 2006 entitled "Reactive Binders For Porous Wall-Flow Filters," now U.S. Pat. No. 7,575,618, and U.S. patent application Ser. No. 11/432,038 filed May 10, 2006 entitled "High Porosity Cordierite Composition," now U.S. Pat. No. 7,648,548, are each hereby incorporated by reference in their entirety.

The processing of ceramic materials usually produces a finished article with a porosity of at least above five percent. Higher porosity is desirable in certain applications, such as exhaust gas converters for internal combustion engines, combustion elements for boilers, reformers of liquid fuel or gaseous fuel, and purification systems for water or sewage. Many high porosity ceramic articles used in these applications have a honeycomb structure to ensure large surface area.

High porosity ceramic articles have a total porosity above about twenty percent. For example, commercial high porosity filters may have porosities from about 40-65%, for example. High porosity can be achieved by mixing a pore-forming agent with ceramic-forming inorganic batch materials, a binder and processing aids to form a plasticized batch mixture, forming the plasticized mixture into a green body, and firing the green body to form the ceramic article. The pore-forming agent is generally used to increase the number of pores and to control the size and volume of pores in the porous ceramic article. In higher porosity articles, the amount of pore former needed increases. As a result, cracking becomes more problematic during both the drying and firing steps. Accordingly, forming ceramic articles with high porosities may result in low yields. Dry yields are the percentage of green bodies that survive drying without significant cracking or deformation. Likewise, firing yields are the percentage of fired bodies that survive firing without significant cracking or deformation. Obviously, high dry and firing yields reduce manufacturing cost and improve efficiency and are, therefore, sought after.

Pore forming agents include carbon-containing compounds, such as graphite, starch, and various organic polymers and resins that will volatilize during firing of the green body. Pore forming agents also include foaming agents and inorganic, hollow particles such as silica micro-balloons. The amount of pore forming agent depends on the desired porosity of the finished ceramic article. For example, a honeycomb ceramic article with approximately thirty percent porosity may be produced from a green body comprising 100 parts by weight of a ceramic-forming powder, up to about 30 parts by weight of an organic pore forming agent, and a sufficient amount of a vehicle, such as water. During firing, the organic pore forming agent volatilizes leaving vacant spaces, that is, pores, in the finished ceramic article. Pores greatly increase the surface area of the article and can even increase thermal shock resistance of the article. In particulate wall-flow filter applications, the pores provide the interconnected flow path for filtration of particulates from the flow stream.

Starch and graphite are used as pore forming agents. Drying of green body articles including these pore formers required a low level of heating. Starch softens at fairly low temperatures, around 80° C., so that a green body having a high fraction of starch can slump during drying, thereby reducing drying yield. One proposed solution is to crosslink the starch before adding it to the mixture. This increases the softening point of the starch and reduces slumping. However, this does nothing to increase the strength of the green body or reduce cracking. Graphite does not soften during drying. However, when microwave radiation is used in the drying processes, the graphite may heat up very quickly, leading to cracking. Accordingly, each pore forming has its drawbacks.

In some applications, higher porosity ceramic articles are desired. For example, high porosity ceramic filters in the exhaust system of a diesel truck can both increase the life of filter and decrease pressure drop through the filter, thereby increasing fuel efficiency of the engine. Manufacturers would like to produce very high porosity ceramic articles, that is, porosities of above fifty-five percent, preferably over sixty percent, and more preferably over sixty-five percent. However, achieving such high porosities is a challenge while maintaining acceptable drying and firing yields. Higher porosity generally means more pore-forming agents, possible thinning of the ceramic walls in the green body with a decrease in strength, and generally lower drying yields. Prior art solutions for increasing drying yield in high porosity ceramic articles include extremely long drying cycles and drying in high humidity conditions. Both solutions interfere with standard manufacturing processes and significantly decrease manufacturing speed.

As such, a need exists for a high porosity ceramic article, and a method of manufacturing such a ceramic article so that cracking of the green body is reduced. Preferably, the article and method will be compatible with existing manufacturing processes.

SUMMARY OF THE INVENTION

The present invention describes a high porosity ceramic article and method of manufacturing the same. The article has a total porosity of at least about fifty-five percent, preferably above sixty percent, and most preferably above sixty-five percent. The method of manufacture reduces the likelihood of cracking in the drying process.

In a broad aspect, the method of manufacture includes mixing a ceramic-forming powder, a crosslinkable pore forming agent, water, and a crosslinker. The crosslinker should not mix exclusively with the pore forming agent and should be adequately dispersed in the green body. During drying, the crosslinker reacts with the pore forming agent thereby forming a network within the green body that strengthens the green body and reduces cracking.

Drying removes water from the green body, which encourages a condensation reaction between the pore forming agent and the crosslinker. Special drying conditions or extended dwell times are unnecessary. In one embodiment, the pore forming agent may comprise an organic compound. The organic pore forming agent may having a reactive moiety, such as a hydroxyl group. The crosslinking agent will be capable of reacting with the reactive moiety to form a network within the green body during the drying process.

In a more particular embodiment, the organic pore former comprises starch or cellulose ethers, such as Methocel®, and the crosslinker includes amide functionality, such as a cyclic amide condensate. During drying, the hydroxyl and amide groups undergo a condensation reaction that results in a crosslinked network in and reduces cracking of the green body. Drying yield increases substantially so that high porosity articles become economical.

DETAILED DESCRIPTION OF THE INVENTION

The article includes a high porosity ceramic article having a porosity of above about 55%, above 60%, or even above 65%. The article may be made by the method of the invention. The method comprises mixing together a ceramic-forming powder, a crosslinkable pore forming agent, a crosslinker, and water; forming the mixture into a green body; drying the green body wherein the pore forming agent and crosslinker react to form a network within the green body; and firing the green body to obtain the finished article. During drying, preferably substantially all of the water is removed. Advantageously, a second pore forming may be added to the mixture to increase further the total porosity of the article.

The ceramic-forming powder may comprise any ceramic-forming compound or compound mixture that is appropriate to the application, and may include alumina or other alumina-forming sources, silica or other silica-forming sources, clay, zirconia, magnesia or magnesia-forming sources, silicate, spinels, zeolites, titania, AT, silicon nitride and silicon carbide and mixtures thereof. In cordierite ceramic article formation, batches including mixtures of silica-, alumina- and magnesia-forming sources are utilized. "Powder" is meant to mean any convenient grain size. Grain size will typically range from 50 nm to 5000 microns. One skilled in the art would appreciate both the composition of the ceramic powder for a particular application.

The crosslinkable pore forming agent may comprise an organic or inorganic compound that includes a moiety capable of reacting with the crosslinker during drying. Drying means removing substantially all water from the green body. Before drying, a green body may comprise over 20 wt. % water. After, drying, and substantial removal of the water, the green body will preferably have less than about 2 wt. % water. Typical drying temperatures are above 100° C., and often range from about 100-140° C. The crosslinking reaction should occur after forming the green body and preferably during drying. Crosslinking before formation of the green body or after drying will be less effective in reducing cracking. In order to produce high porosity ceramic articles, a second pore forming agent may be beneficial. Graphite is useful in this regard where the crosslinkable pore forming agent is starch.

Organic pore forming agents include hydroxyl-containing compounds such as starch and activated cellulose compounds. An example of the latter includes methyl cellulose and methyl cellulose ether, which are available as Methocel® from the Dow Chemical Company. Organic pore forming agents will volatilize during the firing stage of the process, thereby leaving pores in the article. Inorganic pore forming agents include ceramic balloons, such as hollow silica spheres. By way of example, a ceramic article with a total porosity of greater than 60%, say about 65%, can be formed using greater than about 40 wt. %, say about 50 wt. %, organic pore former.

The crosslinker must react with the crosslinkable pore forming agent but should also be dispersed throughout the green body. Crosslinkers that are at least slightly soluble in water will best satisfy this requirement. Conveniently, the crosslinker may also function as a binder. It is most desirable that the crosslinker should not form a discontinuous phase or mix exclusively with the pore forming agent. During drying the dispersed crosslinker will react with the pore forming agent, thereby forming a crosslinked network throughout the green body. The crosslinked network reduces the tendency of the green body to crack during drying.

The crosslinkable pore forming agent will determine the crosslinker to be used. Organic pore formers with hydroxyl functionality can undergo a condensation reaction with amide-containing crosslinkers. Silanes can be effective for various inorganic pore forming agents. Importantly, the drying process should induce the crosslinking reaction. In the present invention, the removal of water form the green body promotes the condensation crosslinking reaction between the pore forming agent and the crosslinker.

A particular embodiment of the invention includes a mixture comprising ceramic forming powder, starch, an amide-containing crosslinker, and water. The ratio of ingredients varies depending on the desired total porosity of the article. The ingredients are mixed and formed into a green body. Drying occurs between 100-140° C. During drying, the hydroxyl group of the starch condenses with the amide group of the crosslinker to form a network within the dried green body. The network reduces cracking during drying. Without intending to be bound by this explanation, the crosslinked network may increase the strength of the green body so that crack propagation is inhibited, especially during drying.

The crosslinker will generally be present in a sufficient amount to produce a network. If effectively dispersed, the amount can be very low. For example, gelled networks can be produced in materials where the crosslinker is present at less than 0.1 wt. %. Experiments have shown that where starch is the crosslinkable pore forming agent, the crosslinker will be present from 0.1-0.6 wt. % of starch, 1-5 wt. %, or even 2-4 wt. %.

EXAMPLE

Two mixtures were made as described below. All number, except drying yield, are in weight percent in the mixture before drying. The mixtures were identical except for the addition of a small amount of crosslinker in Mixture A. Both mixtures were formed into green bodies and then dried at temperatures between 100-140° C. until the water content was below about 1%. The drying yield, that is the percentage of green bodies emerging from drying without deleterious cracking, increased from 50% in the un-crosslinked Mixture B to 92% in crosslinked Mixture A made in accordance with the invention. The total porosity of the fired ceramic article obtained from the mixtures was about 62%.

|  | Mixture A | Mixture B |
| --- | --- | --- |
| Ceramic powder (wt. %) | 50 | 50 |
| Starch (wt. %) | 11 | 11 |
| Graphite (wt. %) | 11 | 11 |
| Methocel ® (wt. %) | 3.5 | 3.5 |
| Crosslinker (wt. %) | 0.6 | 0 |
| Water (wt. %) | 21 | 21 |
| Drying Yield, % | 92 | 50 |

What is claimed is:

1. A method for manufacturing a high porosity ceramic article, comprising the steps of:
   mixing a ceramic powder, a crosslinkable pore forming agent, a crosslinker, and water;
   forming the mixture into a green body;

drying the green body to remove substantially all of the water during which the pore forming agent and crosslinker react to form a network within the green body; and firing the green body to obtain the ceramic article;

wherein the crosslinkable pore forming agent is selected from the group comprising starch, activated cellulose, and mixtures thereof;

wherein the crosslinker includes an amide group; and, wherein the crosslinkable pore forming agent and crosslinker are volatilized during firing.

2. The method of claim 1, wherein the pore forming agent and crosslinker react in a condensation reaction.

3. The method of claim 1, wherein the crosslinkable pore forming agent includes a hydroxyl group.

4. The method of claim 1, wherein the ceramic powder is selected from a group consisting of alumina, silica, clay, zirconia, magnesia, silicate, spinels, zeolites, titania, AT, silicon nitride, and silicon carbide and mixtures thereof.

5. The method of claim 1, wherein the ceramic powder includes a grain size from 50 nm to 5000 microns.

6. The method of claim 1, wherein mixing includes a second pore forming agent.

7. The method of claim 1, wherein a total porosity of the ceramic article is at least about 55%.

8. The method of claim 7, wherein a total porosity of the ceramic article is at least about 60%.

9. A method for manufacturing high porosity ceramic articles, comprising the steps of:

mixing a ceramic powder, starch, an amide-containing crosslinker, and water;

forming the mixture into a green body;

drying the green body to remove substantially all of the water during which the starch and the crosslinker undergo a condensation reaction to form a network within the green body; and firing the green body to obtain the ceramic article.

10. The method of claim 9, wherein the amide-containing crosslinker is present at 0.1-6 wt. % of the starch.

11. The method of claim 9, wherein the mixing includes a second pore forming agent.

12. The method of claim 11, wherein the second pore forming agent comprises graphite.

13. The method of claim 9, wherein the step of drying the green body removes substantially all of the water in the green body.

14. The method of claim 9, wherein a total porosity of the ceramic article is at least about 55%.

* * * * *